(12) United States Patent
Wu (10) Patent No.: US 9,220,009 B2
(45) Date of Patent: Dec. 22, 2015

(54) NAS ALGORITHM TRANSMISSION METHOD AND DEVICE

(71) Applicant: DATANG MOBILE COMMUNICATIONS EQUIPMENT CO., LTD, Beijing (CN)

(72) Inventor: Pengcheng Wu, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 14/381,218

(22) PCT Filed: Nov. 8, 2012

(86) PCT No.: PCT/CN2012/084314
§ 371 (c)(1),
(2) Date: Aug. 27, 2014

(87) PCT Pub. No.: WO2013/127190
PCT Pub. Date: Sep. 6, 2013

(65) Prior Publication Data
US 2015/0118997 A1  Apr. 30, 2015

(30) Foreign Application Priority Data

Feb. 29, 2012  (CN) .......................... 2012 1 0050881

(51) Int. Cl.
*H04M 1/66*  (2006.01)
*H04M 1/68*  (2006.01)
(Continued)

(52) U.S. Cl.
CPC ............. *H04W 12/06* (2013.01); *H04L 63/205* (2013.01); *H04W 12/02* (2013.01); *H04W 12/10* (2013.01); *H04W 80/02* (2013.01); *H04W 8/04* (2013.01); *H04W 88/005* (2013.01)

(58) Field of Classification Search
CPC ..... H04W 12/06; H04W 12/10; H04W 12/02; H04W 80/02; H04W 88/005; H04W 8/04; H04L 63/205
See application file for complete search history.

(56) References Cited

U.S. PATENT DOCUMENTS

2009/0275309 A1* 11/2009 He ................................ 455/410
2009/0298471 A1* 12/2009 He ................................ 455/411
(Continued)

FOREIGN PATENT DOCUMENTS

| CN | 101262337 A | 9/2008 |
|---|---|---|
| CN | 101605324 A | 12/2009 |

(Continued)

OTHER PUBLICATIONS

International Search Report for PCT/CN2012/084314.
(Continued)

*Primary Examiner* — Erin File
(74) *Attorney, Agent, or Firm* — Kilpatrick Townsend & Stockton LLP (57) ABSTRACT

Disclosed are an NAS algorithm transmission method and device, which are used to achieve the process of determining an NAS algorithm by an HSS and sending same to an MME, so that an operator an modify subscription information about the HSS according to a BOSS end, and freely configure the NAS algorithm in accordance with subscribers of different qualifications. An NAS algorithm notification method provided in the application comprises: a home subscriber server (HSS) determining an NAS algorithm list which comprises an NAS encryption algorithm list and an NAS integrity algorithm list; and the HSS sending the NAS algorithm list to a mobility management entity (MME).

16 Claims, 4 Drawing Sheets

An HSS determines a list of NAS algorithms including a list of NAS encryption algorithms and a list of NAS integrity algorithms — S101

The HSS sends the list of NAS algorithms to an MME — S102

(51) Int. Cl.
*H04M 3/16* (2006.01)
*H04W 12/06* (2009.01)
*H04L 29/06* (2006.01)
*H04W 12/02* (2009.01)
*H04W 80/02* (2009.01)
*H04W 12/10* (2009.01)
*H04W 8/04* (2009.01)
*H04W 88/00* (2009.01)

(56) References Cited

U.S. PATENT DOCUMENTS

| | | | |
|---|---|---|---|
| 2010/0002883 A1* | 1/2010 | Sammour et al. | 380/272 |
| 2010/0056156 A1* | 3/2010 | Xu et al. | 455/436 |
| 2011/0072488 A1* | 3/2011 | Bi et al. | 726/1 |
| 2011/0080885 A1 | 4/2011 | Shin et al. | |
| 2012/0066737 A1* | 3/2012 | Zhang et al. | 726/1 |

FOREIGN PATENT DOCUMENTS

| | | |
|---|---|---|
| CN | 102083064 A | 6/2011 |
| CN | 102256234 A | 11/2011 |
| CN | 102595369 A | 7/2012 |
| EP | 1860906 | 11/2007 |
| EP | 2416521 | 2/2012 |

OTHER PUBLICATIONS

3GPP: "3rd Generation Partnership Project; Technical Specification Group Services and System Aspects; 3GPP System Architecture Evolution (SAE); Security architecture (Release 11)", 3GPP Draft; 33401-820, 3RD Generation Partnership Project (3GPP), Mobile Competence Centre; 650, Route Des Lucioles; F-06921 Sophia-Antipolis Cedex; France, Dec. 19, 2011, XP050577042, [retrieved on Dec. 19, 2011].

The Extended European Search Report issued on Oct. 6, 2015 in the EP counterpart application (12870292.5).

* cited by examiner

NAS ALGORITHM TRANSMISSION METHOD AND DEVICE

This application is a US National Stage of International Application No. PCT/CN2012/084314, filed on Nov. 8, 2012, designating the United States, and claiming priority to Chinese Patent Application No. 201210050881.9, filed with the Chinese Patent Office on Feb. 29, 2012 and entitled "Method and device for transmitting NAS algorithm", the content of which is hereby incorporated by reference in its entirety.

FIELD

The present invention relates to the field of communication technologies and particularly to a method and device for transmitting an NAS algorithm.

BACKGROUND

In a Long Term Evolution (LTE) network, transmission of a Non-Access Stratum (NAS) message between a Mobility Management Entity (MME) and a User Equipment (UE) is integrity-protected and security-protected. The MME can decide which security algorithm to use according to a network capability reported by the UE and capabilities and the priorities of the security algorithms configured by the MME.

In the existing solution in which capabilities and priorities of algorithms are configured on the MME, it may not be easy to change a set of algorithms and their priorities in the case of fixed configuration data. Moreover currently used algorithms include the Evolved Packet System (EPS) Encryption Algorithms 0 to the EPS Encryption Algorithm 7 (EEA0 to EEA7, where EEA stands for EPS Encryption Algorithm) and the EPS Integrity Algorithm 0 to the EPS Integrity Algorithm 7 (EIA0 to EIA7, where EIA stands for EPS Integrity Algorithm), where the security protection level and the operation efficiency of each of the algorithms are different from those of another algorithm, and the existing solution to configuration of a list of NAS algorithms can not accommodate a demand of a user for the diversity of the NAS security algorithms.

In the LTE network, the MME selects an encryption algorithm and an integrity algorithm primarily dependent upon a UE security capability reported by the UE and a set of algorithms and their priorities configured on the MME.

In the protocol 3GPP TS 33.401 V9.4.0, Section 7.2.4.3, the MME needs to be capable of configuring a list of encryption algorithms and a list of integrity algorithms by configuring the lists of algorithms. When an NAS security context is created, the MME selects an NAS security algorithm ranked at the highest priority from a set of algorithms. And the MME sends the selected algorithm and a security capability supported by the UE to the UE in a Security Mode Command message by initiating a security mode control procedure.

In other words, the MME decides and selects the algorithm according to the UE security capability and the set of NAS security algorithms and priorities of the algorithms configured at the network side.

The security capability of the UE side is decided by algorithms supported by the UE itself and possibly the security capability of the UE itself. The set of NAS security algorithms and the priorities of the algorithms configured at the network side are preconfigured on the MME. If a plurality of UEs report the same security capability, then the MME shall definitely select the same algorithm without reflecting the difference and the diversity between users.

Moreover the security protection level and the operation efficiency of each of the encryption algorithms EEA0 to EEA7 and the integrity algorithms EIA0 to EIA7 are different from those of another algorithm. The efficiency and the security level as required vary from one user to another.

In summary, with the solution in the prior art to configuration of the list of NAS security algorithms at the network side, an operator can not change flexibly for a particular UE a security algorithm for use at the NAS.

SUMMARY

Embodiments of the invention provide a method and device for transmitting an NAS algorithm so as to perform a process in which an NAS algorithm is determined and sent by a Home Subscriber Server (HSS) to an MME so that an operator can modify subscription information of the HSS according to a Business Operating Support System (BOSS) end and configure flexibly NAS algorithms for differently qualified users.

An embodiment of the invention provides a notification method of an NAS algorithm, the method including:

determining, by a Home Subscriber Server, HSS, a list of NAS algorithms including a list of NAS encryption algorithms and a list of NAS integrity algorithms; and sending, by the HSS, the list of NAS algorithms to a Mobility Management Entity, MME.

An embodiment of the invention provides an obtainment method of an NAS algorithm, the method including:

receiving, by a Mobility Management Entity, MME, a message, carrying a list of NAS algorithms, sent by a Home Subscriber Server, HSS, wherein the list of NAS algorithms includes a list of NAS encryption algorithms and a list of NAS integrity algorithms; and obtaining, by the MME, the list of NAS algorithms from the message.

An embodiment of the invention provides a notification device of an NAS algorithm, the apparatus including:

a list of NAS algorithms determination unit configured to determine a list of NAS algorithms including a list of NAS encryption algorithms and a list of NAS integrity algorithms; and a notification unit configured to send the list of NAS algorithms to a Mobility Management Entity, MME.

An embodiment of the invention provides an obtainment device of an NAS algorithm, the device including:

a message reception unit configured to receive a message, carrying a list of NAS algorithms, sent by a Home Subscriber Server, HSS, wherein the list of NAS algorithms includes a list of NAS encryption algorithms and a list of NAS integrity algorithms; and an obtainment unit configured to obtain the list of NAS algorithms from the message.

In the embodiments of the invention, a Home Subscriber Server (HSS) determines a list of NAS algorithms including a list of NAS encryption algorithms and a list of NAS integrity algorithms; and the HSS sends the lists of NAS algorithms to a Mobility Management Entity, MME, so as to implement such a strategy that the list of NAS algorithms is configured by the HSS, so that an operator can modify user subscriber data in the HSS through a BOSS system to associate an NAS security algorithm with a Quality of Service (QoS) and other user information and can select a differently characterized algorithm for security protection on an NAS message for a demand of a different user.

DETAILED DESCRIPTION OF THE EMBODIMENTS

Embodiments of the invention provide a method and device for transmitting an NAS algorithm so as to perform a process in which an NAS algorithm is determined and sent by an HSS to an MME so that an operator can modify subscription information of the HSS according to a BOSS end and configure flexibly NAS algorithms for differently qualified users.

A list of NAS algorithms is sent by the HSS instead of being configured by the MME in the embodiments of the invention. The operator can modify the subscription information of the HSS according to a Business Operating Support System (BOSS) end and configure flexibly lists of algorithms for differently qualified users.

Figure 1:
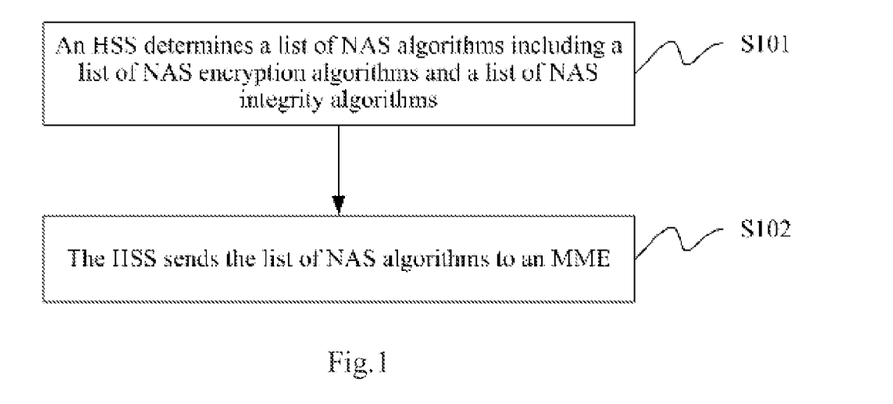
FIG. 1 is a schematic flow chart of a notification method of an NAS algorithm according to an embodiment of the invention.

Referring to FIG. 1, an embodiment of the invention provides a notification method of an NAS algorithm, the method including:

S101. An HSS determines a list of NAS algorithms including a list of NAS encryption algorithms and a list of NAS integrity algorithms; and S102. The HSS sends the list of NAS algorithms to an MME.

Preferably the HSS sends the list of NAS algorithms to the MME particularly as follows:

The HSS passes the list of NAS algorithms to the MME in a procedure of obtaining of authentication information or a procedure of inserting of subscription data.

Preferably the HSS passes the list of NAS algorithms to the MME in the procedure of obtaining of authentication information particularly as follows:

The HSS receives an Authentication Information Request message sent by the MME; and The HSS sends an Authentication Information Answer message carrying the list of NAS algorithms to the MME.

Preferably the HSS passes the list of NAS algorithms to the MME in the procedure of inserting of subscription data particularly as follows:

When the subscription data is updated, the HSS sends an Insert Subscriber Data Request message carrying the list of NAS algorithms to the MME.

Preferably algorithms in the list of NAS algorithms are ranked in a descending order of preset priorities.

Figure 2:
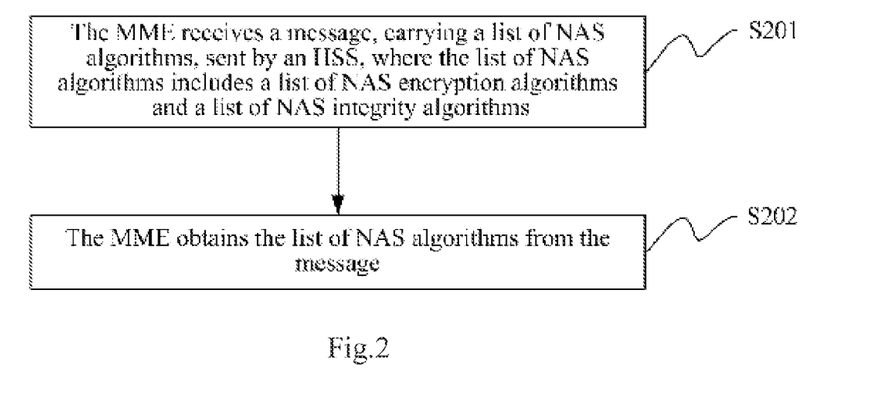
FIG. 2 is a schematic flow chart of an obtainment method of an NAS algorithm according to an embodiment of the invention.

Correspondingly referring to FIG. 2, an embodiment of the invention provides an obtainment method of an NAS algorithm, the method including:

S201. The MME receives a message, carrying a list of NAS algorithms, sent by an HSS. where the list of NAS algorithms includes a list of NAS encryption algorithms and a list of NAS integrity algorithms; and S202. The MME obtains the list of NAS algorithms from the message.

Preferably the MME receives the message, carrying the list of NAS algorithms, sent by the HSS in a procedure of obtaining of authentication information or a procedure of inserting of subscription data.

Preferably the MME receives the message, carrying the list of NAS algorithms, sent by the HSS in the procedure of obtaining of authentication information particularly as follows:

The MME sends an Authentication Information Request message to the HSS; and

The MME receives an Authentication Information Answer message, carrying the list of NAS algorithms, sent by the HSS.

Preferably the MME receives the message, carrying the list of NAS algorithms, sent by the HSS in the procedure of inserting of subscription data particularly as follows:

When subscription data is updated, the MME receives an Insert Subscriber Data Request message, carrying the list of NAS algorithms, sent by the HSS.

Preferably algorithms in the list of NAS algorithms are ranked in a descending order of preset priorities.

Preferably after the MME obtains the list of NAS algorithms, the method further includes:

The MME selects an NAS algorithm from the list of NAS algorithms and notifies a UE of the selected NAS algorithm.

Preferably the MME selects the NAS algorithm from the list of NAS algorithms and notifies the UE of the selected NAS algorithm particularly as follows:

The MME determines a set A1 of NAS encryption algorithms and a set A2 of NAS integrity algorithms supported by the MME;

The MME determines a set B1 of NAS encryption algorithms and a set B2 of NAS integrity algorithms supported by the UE;

The MME determines the set C1 of NAS encryption algorithms and the set C2 of NAS integrity algorithms in the list of NAS algorithms;

The MME determines an intersection D1 of the sets A1. B1 and C1 and an intersection D2 of the sets A2, B2 and C2; and The MME notifies the UE of NAS encryption algorithms in the intersection D1 and NAS integrity algorithms in the intersection D2.

Preferably the method further includes:

When the list of NAS algorithms is updated, the MME obtains an updated list of NAS algorithms from an Insert Subscriber Data Request message sent by the HSS;

The MME reselects an NAS algorithm from the updated list of NAS algorithms;

When the reselected NAS algorithm is different from a current NAS algorithm, the MME sends a Security Mode Command message carrying the reselected NAS algorithm to the UE; and When the reselected NAS algorithm is the same as the current NAS algorithm, or when the MME reselects the NAS algorithm from the updated lists of NAS algorithms unsuccessfully, the MME replies with an Insert Subscriber Data Answer message to the HSS.

Preferably after the MME sends the Security Mode Command message to the UE, the method further includes:

The MME receives a Security Mode Complete message or a Security Mode Reject message sent by the UE; and The MME replies with an Insert Subscriber Data Answer message to the HSS.

In the embodiment of the invention, defined information elements are added in advance to Table 7.3.1/1 of the protocol 3GPP TS 29.272, as depicted in Table 7.3.1/1 below:

TABLE 7.3.1/1

S6a/S6d and S13/S13' specific Diameter AVPs)

| Attribute Name | AVP Code | Section defined | Value Type | AVP Flag rules | | | | |
|---|---|---|---|---|---|---|---|---|
| | | | | Must | May | Should not | Must not | May encrypted |
| NAS-Algorithms-Lists | 1651 | 7.3.165 | Grouped | M, V | | | | No |
| NAS-ciphering-algorithms-List | 1652 | 7.3.166 | UTF8String | M, V | | | | No |
| NAS-integrity-algorithms-List | 1653 | 7.3.167 | UTF8String | M, V | | | | No |

Moreover, Section 7.3.165 is added in advance to 3GPP TS 29.272 as described below:

NAS-Algorithms-Lists

The AVP format shall conform to:

NAS-Algorithms-Lists::= <AVP header: 1613 10415>
{ NAS-ciphering-algorithms-List}
{ NAS-integrity-algorithms-List }

And Section 7.3.166 is added in advance to 3GPP TS 29.272 as described below:

NAS-ciphering-algorithms-List

NAS-ciphering-algorithms-List, where supported encryption algorithms are represented by a character string (UTF8string type) of a length no more than 8. and 0 to 7 represent EEA0 to EEA7 respectively which are ranked in a descending order of priorities.

And Section 7.3.166 is added in advance to 3GPP TS 29.272 as described below:

NAS-integrity-algorithms-List

NAS-integrity-algorithms-List, where supported integrity algorithms are represented by a character string (UTF8String type) of a length no more than 8. and 0 to 7 represent EIA0 to EIA7 respectively which are ranked in a descending order of priorities.

Two possible particular schemes of transmitting a list of NAS algorithms are as follows:

The first scheme: a list of NAS algorithms (NAS-integrity-algorithms-List) is passed in a procedure of obtaining of authentication information (that is, Authentication Procedure) between the HSS and the MME.

A list of NAS algorithms (NAS-Algorithms-Lists) is added to the structure of the existing Authentication Information Answer message (see Table 5.2.3.1.1/2) as depicted in Table 5.2.3.1.1/2 below:

TABLE 5.2.3.1.1/2

Authentication Information Answer

| Information element name | Mapping to Diameter AVP | Cat. | Description |
|---|---|---|---|
| Result (See 7.4) | Result-Code/ Experimental-Result | M | This IE shall contain the result of the operation. This IE shall contain the Result-Code AVP shall be used to indicate success/errors as defined in the Diameter Base Protocol. The Experimental-Result AVP shall be used for S6a/S6d errors. This is a grouped AVP which shall contain the 3GPP Vendor ID in the Vendor-Id AVP, and the error code in the Experimental-Result-Code AVP. The following errors are applicable in this case: User Unknown Unknown EPS Subscription |
| Supported Features (See 3GPP TS 29.229 [9]) | Supported-Features | O | If present, this information element shall contain the list of features supported by the origin host. |
| Authentication Info (See 7.3.17) | Authentication-Info | C | This IE shall contain the Authentication Vectors. |
| NAS-Algorithms-Lists | NAS-Algorithms-Lists | C | This IE shall contain the NAS Algorithms Lists. |

Figure 3:
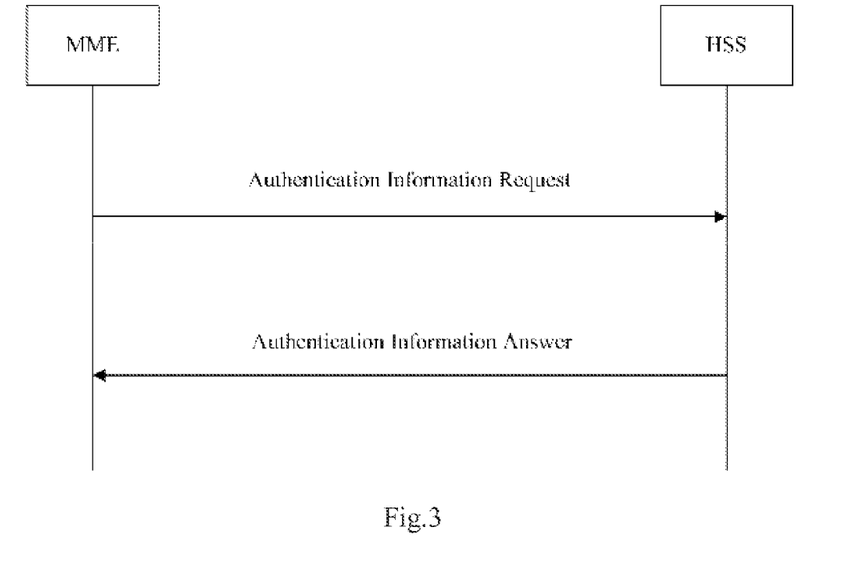
FIG. 3 is a schematic diagram of a procedure of obtaining of authentication information according to an embodiment of the invention.

The HSS passes a list of NAS algorithms to the MME in the procedure of obtaining of authentication information as illustrated in FIG. 3.

The MME sends an Authentication Information Request message to the HSS, and upon reception of the message the HSS sends an Authentication Information Answer message, including a list of NAS algorithms relevant to a user, to the MME. The list of NAS algorithms includes a list of NAS encryption algorithms and a list of NAS integrity algorithms, where respective algorithms in the list of NAS encryption algorithms and the list of NAS integrity algorithms are ranked in a descending order of priorities.

The second scheme: a list of NAS algorithms (NAS-integrity-algorithms-List) is passed in a procedure of inserting of subscription data (Insert Subscriber Data Procedure) between the HSS and the MME.

TABLE 5.2.2.1.1/1

Insert Subscriber Data Request

| Information element name | Mapping to Diameter AVP | Cat. | Description |
| --- | --- | --- | --- |
| IMSI | User-Name (See IETF RFC 3588 [4]) | M | This information element shall contain the user IMSI, formatted according to 3GPP TS 23.003 [3], clause 2.2. |
| Supported Features (See 3GPP TS 29.229 [9]) | Supported-Features | O | If present, this information element shall contain the list of features supported by the origin host. |
| Subscription Data (See 7.3.2) | Subscription-Data | M | This Information Element shall contain the part of the subscription profile that either is to be added to the subscription profile stored in the MME or SGSN or is replacing a part of the subscription profile stored in the MME or SGSN. |
| IDR Flags (See 7.3.103) | IDR-Flags | C | This Information Element shall contain a bit mask. See 7.3.103 for the meaning of the bits. |
| NAS Algorithms-Lists | NAS Algorithms-Lists | C | This IE shall contain the NAS Algorithms Lists. |

Figure 4:
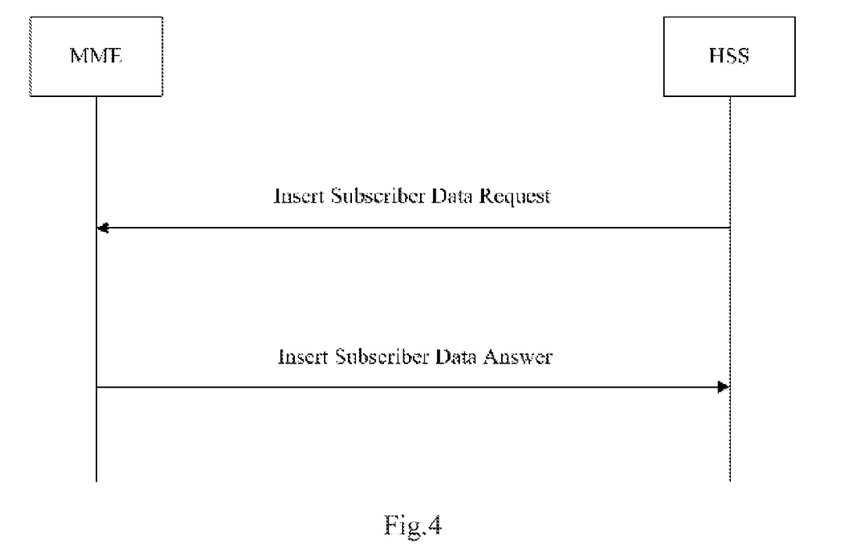
FIG. 4 is a schematic diagram of a procedure of inserting of subscription data according to an embodiment of the invention.

The HSS passes a list of NAS algorithms to the MME in the procedure of inserting of subscription data as illustrated in FIG. 4.

When subscription data is changed, the HSS sends an Insert Subscriber Data Request message including a list of NAS algorithms relevant to a user to the MME. The list of NAS algorithms includes a list of NAS encryption algorithms and a list of NAS integrity algorithms, where respective algorithms in the list of NAS encryption algorithms and the list of NAS integrity algorithms are ranked in a descending order of priorities. The MME replies with an Insert Subscriber Data Answer message to the HSS upon reception of the Insert Subscriber Data Request.

A method of selecting by an MME an NAS encryption algorithm and an NAS integrity algorithm from a received list of NAS algorithms according to an embodiment of the invention will be described below.

The same processing flow is performed for an NAS encryption algorithm and an NAS integrity algorithm, and the following description will be given taking one of the algorithms as an example.

The MME needs to support a set of as many algorithms as possible, e.g., a set A of algorithms.

The UE sends an Attach Request message or a Tracking Area Update Request message carrying a UE network capability to the MME, that is, the UE notifies the MME of a set of algorithms supported by the UE, denoted as a set B.

An operator can set different sets of algorithms and priorities for respective users according to the qualification of the users and pass a list of NAS algorithms to the MME in a procedure of obtaining of authentication information or a process of inserting of subscription data, where a set of algorithms in the list of NAS algorithms is denoted as C.

Firstly a set D of algorithms is selected as an intersection of the three sets A, B and C, that is, $D = A \cap B \cap C$.

An NAS encryption algorithm or an NAS integrity algorithm with the highest priority is selected from the calculated set D according to the priorities represented by the list of NAS algorithms.

The MME sends the selected NAS encryption algorithm or NAS integrity algorithm to the UE in a Security Mode Command message.

A processing flow after a list of NAS algorithms is passed in a procedure of inserting of subscription data between the HSS and the MME according to an embodiment of the invention will be described below.

Figure 5:
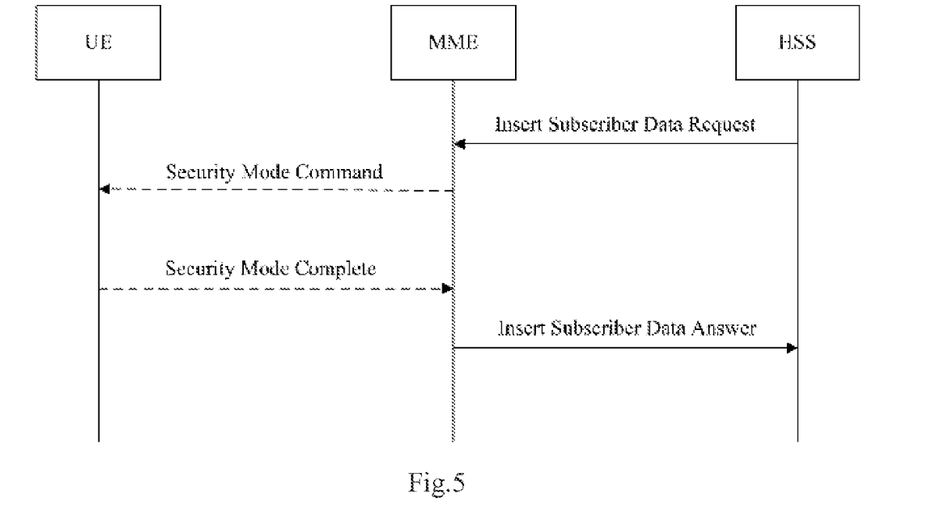
FIG. 5 is a schematic diagram of a procedure of inserting of subscription data successfully according to an embodiment of the invention.

Referring to FIG. 5, a flow of inserting of subscription data successfully is as follows:

In the step 1, when a list of NAS algorithms is changed, the HSS sends an Insert Subscriber Data Request message carrying the list of NAS algorithms to the MME.

In the step 2, the MME obtains the list of NAS algorithms from the Insert Subscriber Data Request message, and then reselects an NAS algorithm from the list of NAS algorithms.

If it is determined that the reselected NAS algorithm is different from an NAS algorithm currently adopted between the MME and the UE, then the MME sends a Security Mode Command message carrying the reselected NAS algorithm to the UE.

If the reselected NAS algorithm is the same as the NAS algorithm currently adopted between the MME and the UE, then no Security Mode Control (SMC) procedure is initiated between the MME and the UE, but the MME replies with an Insert Subscriber Data Answer directly to the HSS, thus inserting subscription data successfully.

In the step 3, the UE performs checking on the Security Mode Command message and the UE sends a Security Mode Complete message to the MME upon successful checking.

In the step 4, the MME performs integrity protection checking and decryption on the Security Mode Complete message, and the NAS algorithm is updated successfully upon successful checking and decryption. The MME replies with an Insert Subscriber Data Answer to the HSS, thus inserting subscription data successfully.

Figure 6:
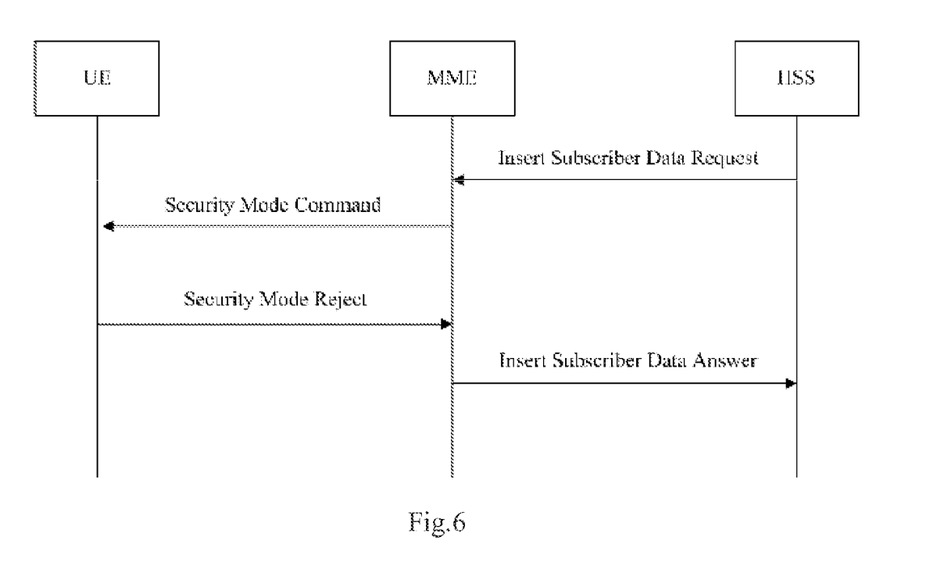
FIG. 6 is a schematic diagram of a procedure of inserting of subscription data unsuccessfully according to an embodiment of the invention.

Referring to FIG. 6, a flow of inserting of subscription data unsuccessfully is as follows:

In the step 1. when a list of NAS algorithms is changed, the HSS sends an Insert Subscriber Data Request message carrying an updated list of NAS algorithms to the MME.

In the step 2, the MME obtains the list of NAS algorithms from the Insert Subscriber Data Request message, and then reselects an NAS algorithm from the list of NAS algorithms.

If it is determined that the reselected NAS algorithm is different from an NAS algorithm currently adopted between the MME and the UE, then the MME sends a Security Mode Command message carrying the reselected NAS algorithm to the UE.

If the procedure of reselecting of the NAS algorithm is unsuccessful, then no Security Mode Control (SMC) procedure is initiated between the MME and the UE, but the MME replies with an Insert Subscriber Data Answer directly to the HSS. thus inserting subscription data unsuccessfully.

In the step 3, the UE performs checking on the Security Mode Command message and the UE sends a Security Mode Reject message to the MME upon unsuccessful checking.

In the step 4, the MME replies with an Insert Subscriber Data Answer to the HSS upon reception of the Security Mode Reject message, thus inserting subscription data unsuccessfully.

Figure 7:
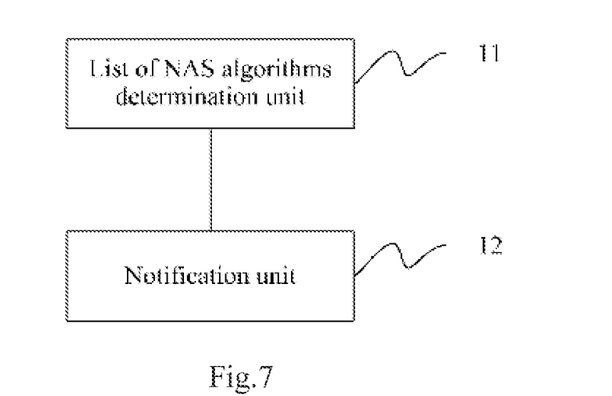
FIG. 7 is a schematic structural diagram of a notification device of an NAS algorithm according to an embodiment of the invention.

Referring to FIG. 7, an embodiment of the invention provides a notification device of an NAS algorithm, the device including:

A list of NAS algorithms determination unit 11 is configured to determine a list of NAS algorithms including a list of NAS encryption algorithms and a list of NAS integrity algorithms: and A notification unit 12 is configured to send the list of NAS algorithms to an MME.

Preferably the notification unit 12 is further configured:

To pass the list of NAS algorithms to the MME in a procedure of obtaining of authentication information or a procedure of inserting of subscription data.

Preferably the notification unit 12 configured to pass the list of NAS algorithms to the MME in the procedure of obtaining of authentication information is further configured:

To receive an Authentication Information Request message sent by the MME; and

To send an Authentication Information Answer message carrying the list of NAS algorithms to the MME.

Preferably the notification unit 12 configured to pass the list of NAS algorithms to the MME in the procedure of inserting of subscription data is further configured:

To send an Insert Subscriber Data Request message, carrying the list of NAS algorithms, to the MME when subscription data is updated.

Preferably algorithms in the list of NAS algorithms are ranked in a descending order of preset priorities.

Preferably the notification device of an NAS algorithm according to the embodiment of the invention is an HSS.

Figure 8:
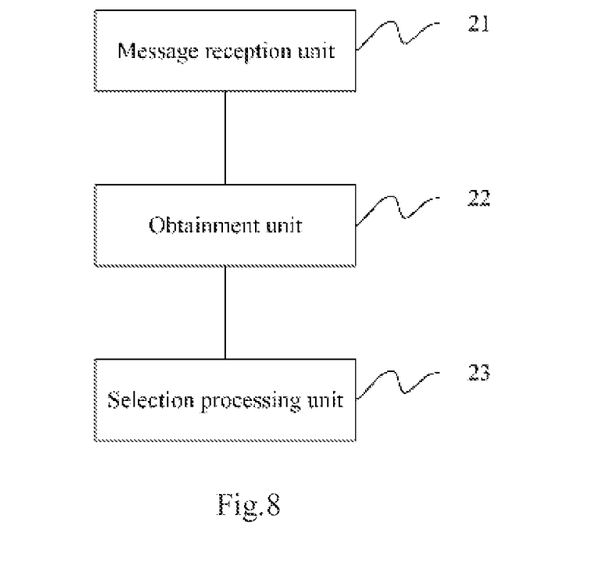
FIG. 8 is a schematic structural diagram of an obtainment device of an NAS algorithm according to an embodiment of the invention.

Referring to FIG. 8, an embodiment of the invention provides an obtainment device of an NAS algorithm, the device including:

A message reception unit 21 is configured to receive a message, carrying a list of NAS algorithms, sent by an HSS, where the list of NAS algorithms includes a list of NAS encryption algorithms and a list of NAS integrity algorithms; and An obtainment unit 22 is configured to obtain the list of NAS algorithms from the message.

Preferably the message reception unit 21 is further configured:

To receive the message, carrying the list of NAS algorithms, sent by the HSS in a procedure of obtaining of authentication information or a procedure of inserting of subscription data.

Preferably the message reception unit 21 configured to receive the message, carrying the list of NAS algorithms, sent by the HSS in the procedure of obtaining of authentication information is further configured:

To send an Authentication Information Request message to the HSS: and

To receive an Authentication Information Answer message, carrying the list of NAS algorithms, sent by the HSS.

Preferably the message reception unit 21 configured to receive the message, carrying the list of NAS algorithms, sent by the HSS in the procedure of inserting of subscription data is further configured:

To receive an Insert Subscriber Data Request message, carrying the list of NAS algorithms, sent by the HSS when subscription data is updated.

Preferably algorithms in the list of NAS algorithms are ranked in a descending order of preset priorities.

Preferably the device further includes:

A selection processing unit 23 is configured to select an NAS algorithm from the list of NAS algorithms and notify a UE of the selected NAS algorithm after the obtainment unit 22 obtains the list of NAS algorithms from the message.

Preferably the selection processing unit 23 is further configured:

To determine a set A1 of NAS encryption algorithms and a set A2 of NAS integrity algorithms supported by the MME:

To determine a set B1 of NAS encryption algorithms and a set B2 of NAS integrity algorithms supported by the UE;

To determine the set C1 of NAS encryption algorithms and the set C2 of NAS integrity algorithms;

To determine an intersection D1 of the sets A1, B1 and C1 and an intersection D2 of the sets A2, B2 and C2; and To notify the UE of NAS encryption algorithms in the intersection D1 and NAS integrity algorithms in the intersection D2.

Preferably:

The message reception unit 21 is further configured to obtain an updated list of NAS algorithms from an Insert Subscriber Data Request message sent by the HSS when the list of NAS algorithms is updated; and The selection processing unit 23 is further configured to reselect an NAS algorithm from the updated list of NAS algorithms; to send a Security Mode Command message carrying the reselected NAS algorithm to the UE when the reselected NAS algorithm is different from a current NAS algorithm; and to reply with an Insert Subscriber Data Answer message to the HSS when the reselected NAS algorithm is the same as the current NAS algorithm or when the NAS algorithm is reselected from the updated lists of NAS algorithms unsuccessfully.

Preferably after sending the Security Mode Command message to the UE, the selection processing unit 23 is further configured:

To receive a Security Mode Complete message or a Security Mode Reject message sent by the UE; and To reply with an Insert Subscriber Data Answer message to the HSS.

Preferably the obtainment device of an NAS algorithm according to the embodiment of the invention is an MME.

In summary, in the embodiments of the invention, the defined information element NAS-Algorithms-List is added to the protocol 3GPP TS 29.272, and the NAS-Algorithms-List is passed during the procedure of obtaining of authentication information between the HSS and the MME, or the NAS-Algorithms-List is passed during the procedure of inserting of subscription data between the HSS and the MME, thereby enforce such a strategy that the list of NAS algorithms is configured by the HSS, so that an operator can modify subscriber data in the HSS through a BOSS system to associate an NAS security algorithm with a QoS and other user information and can select a differently characterized algorithm for security protection on an NAS message in view of a demand of a different user.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A notification method of a Non Access Stratum, NAS, algorithm, the method comprises:
   determining, by a Home Subscriber Server, HSS, a list of NAS algorithms comprising a list of NAS encryption algorithms and a list of NAS integrity algorithms; and
   sending, by the HSS, the list of NAS algorithms to a Mobility Management Entity, MME, so that the MME selects the NAS algorithm from the list of NAS algorithms and notifying the UE of the selected NAS algorithm, and MME and UE perform encryption protection and integrity protection for a NAS message using the selected the NAS algorithm;
   wherein the step of selecting and notifying by the MME comprises:
   determining, by the MME, a set A1 of NAS encryption algorithms and a set A2 of NAS integrity algorithms supported by the MME;
   determining, by the MME, a set B1 of NAS encryption algorithms and a set B2 of NAS integrity algorithms supported by the UE;
   determining, by the MME, the set C1 of NAS encryption algorithms and the set C2 of NAS integrity algorithms in the list of NAS algorithms;
   determining, by the MME, an intersection D1 of the sets A1, B1 and C1 and an intersection D2 of the sets A2, B2 and C2; and
   notifying, by the MME, the UE of NAS encryption algorithms in the intersection D1 and NAS integrity algorithms in the intersection D2.

2. The method according to claim 1, wherein sending, by the HSS, the list of NAS algorithms to the MME comprises:
   passing, by the HSS, the list of NAS algorithms to the MME in a procedure of obtaining of authentication information or a procedure of inserting of subscription data.

3. The method according to claim 2, wherein:
   when the HSS passes the list of NAS algorithms to the MME in the procedure of obtaining of authentication information, the step of the passing comprises:
   receiving, by the HSS, an Authentication Information Request message sent by the MME; and
   sending, by the HSS, an Authentication Information Answer message carrying the list of NAS algorithms to the MME; or
   when the HSS passes the list of NAS algorithms to the MME in the procedure of inserting of subscription data, the step of the passing comprises:
   when the subscription data is updated, sending, by the HSS, an Insert Subscriber Data Request message carrying the list of NAS algorithms to the MME.

4. The method according to claim 1, wherein algorithms in the list of NAS algorithms are ranked in a descending order of preset priorities.

5. An obtainment method of a Non Access Stratum, NAS, algorithm, the method comprises:
   receiving, by a Mobility Management Entity, MME, a message, carrying a list of NAS algorithms, sent by a Home Subscriber Server, HSS, wherein the list of NAS algorithms comprises a list of NAS encryption algorithms and a list of NAS integrity algorithms;
   obtaining, by the MME, the list of NAS algorithms from the message; and
   selecting, by the MME, an NAS algorithm from the list of NAS algorithms and notifying a User Equipment, UE, of the selected NAS algorithm; and performing encryption protection and integrity protection for a NAS message using the selected the NAS algorithm;
   wherein the step of the selecting and notifying by the MME comprises:
   determining, by the MME, a set A1 of NAS encryption algorithms and a set A2 of NAS integrity algorithms supported by the MME;

determining, by the MME, a set B1 of NAS encryption algorithms and a set B2 of NAS integrity algorithms supported by the UE;

determining, by the MME, the set C1 of NAS encryption algorithms and the set C2 of NAS integrity algorithms in the list of NAS algorithms;

determining, by the MME, an intersection D1 of the sets A1, B1 and C1 and an intersection D2 of the sets A2, B2 and C2; and notifying, by the MME, the UE of NAS encryption algorithms in the intersection D1 and NAS integrity algorithms in the intersection D2.

6. The method according to claim 5, wherein the MME receives the message, carrying the list of NAS algorithms, sent by the HSS in a procedure of obtaining of authentication information or a procedure of inserting of subscription data.

7. The method according to claim 6, wherein:

when the MME receives the message, carrying the list of NAS algorithms, sent by the HSS in the procedure of obtaining of authentication information, the step of the receiving comprises:

sending, by the MME, an Authentication Information Request message to the HSS; and receiving, by the MME, an Authentication Information Answer message, carrying the list of NAS algorithms, sent by the HSS; or when the MME receives the message, carrying the list of NAS algorithms, sent by the HSS in the procedure of inserting of subscription data, the step of the receiving comprises:

when the subscription data is updated, receiving, by the MME, an Insert Subscriber Data Request message, carrying the list of NAS algorithms, sent by the HSS.

8. The method according to claim 5, wherein algorithms in the list of NAS algorithms are ranked in a descending order of preset priorities.

9. The method according to claim 5, wherein the method further comprises:

when the list of NAS algorithms is updated, obtaining, by the MME, an updated list of NAS algorithms from an Insert Subscriber Data Request message sent by the HSS;

reselecting, by the MME, an NAS algorithm from the updated list of NAS algorithms;

when the reselected NAS algorithm is different from a current NAS algorithm, sending, by the MME, a Security Mode Command message carrying the reselected NAS algorithm to the UE; and when the reselected NAS algorithm is the same as the current NAS algorithm, or when the MME reselects the NAS algorithm from the updated lists of NAS algorithms unsuccessfully, replying, by the MME, with an Insert Subscriber Data Answer message to the HSS.

10. The method according to claim 9, wherein after the MME sends the Security Mode Command message to the UE, the method further comprises:

receiving, by the MME, a Security Mode Complete message or a Security Mode Reject message sent by the UE; and replying, by the MME, with an Insert Subscriber Data Answer message to the HSS.

11. A notification device of a Non Access Stratum, NAS, algorithm, the device comprises:

a list of NAS algorithms determination unit configured to determine a list of NAS algorithms comprising a list of NAS encryption algorithms and a list of NAS integrity algorithms; and a notification unit configured to send the list of NAS algorithms to a Mobility Management Entity, MME; wherein the MME is configured to select the NAS algorithm from the list of NAS algorithms and notify the UE of the selected NAS algorithm, and perform encryption protection and integrity protection for a NAS message using the selected the NAS algorithm;

wherein the selecting and notifying by the MME comprises:

determining, by the MME, a set A1 of NAS encryption algorithms and a set A2 of NAS integrity algorithms supported by the MME;

determining, by the MME, a set B1 of NAS encryption algorithms and a set B2 of NAS integrity algorithms supported by the UE;

determining, by the MME, the set C1 of NAS encryption algorithms and the set C2 of NAS integrity algorithms in the list of NAS algorithms;

determining, by the MME, an intersection D1 of the sets A1, B1 and C1 and an intersection D2 of the sets A2, B2 and C2; and notifying, by the MME, the UE of NAS encryption algorithms in the intersection D1 and NAS integrity algorithms in the intersection D2.

12. The device according to claim 11, wherein the notification unit is further configured:

to pass the list of NAS algorithms to the MME in a procedure of obtaining of authentication information or a procedure of inserting of subscription data.

13. The device according to claim 12, wherein:

the notification unit configured to pass the list of NAS algorithms to the MME in the procedure of obtaining of authentication information is further configured: to receive an Authentication Information Request message sent by the MME; and to send an Authentication Information Answer message carrying the list of NAS algorithms to the MME; or the notification unit configured to pass the list of NAS algorithms to the MME in the procedure of inserting of subscription data is further configured: to send an Insert Subscriber Data Request message, carrying the list of NAS algorithms, to the MME when the subscription data is updated.

14. An obtainment device of a Non Access Stratum, NAS, algorithm, the device comprises:

a message reception unit configured to receive a message, carrying a list of NAS algorithms, sent by a Home Subscriber Server, HSS, wherein the list of NAS algorithms comprises a list of NAS encryption algorithms and a list of NAS integrity algorithms;

an obtainment unit configured to obtain the list of NAS algorithms from the message; and a selection processing unit configured to select an NAS algorithm from the list of NAS algorithms and notify a User Equipment, UE, of the selected NAS algorithm after the obtainment unit obtains the list of NAS algorithms from the message, and perform encryption protection and integrity protection for a NAS message using the selected the NAS algorithm;

wherein the selection processing unit is further configured:

to determine a set A1 of NAS encryption algorithms and a set A2 of NAS integrity algorithms supported by the MME;

to determine a set B1 of NAS encryption algorithms and a set B2 of NAS integrity algorithms supported by the UE;

to determine the set C1 of NAS encryption algorithms and the set C2 of NAS integrity algorithms in the list of NAS algorithms;

to determine an intersection D1 of the sets A1, B1 and C1 and an intersection D2 of the sets A2, B2 and C2; and to notify the UE of NAS encryption algorithms in the intersection D1 and NAS integrity algorithms in the intersection D2.

15. The device according to claim 14, wherein the message reception unit is further configured:

to receive the message, carrying the list of NAS algorithms, sent by the HSS in a procedure of obtaining of authentication information or a procedure of inserting of subscription data.

16. The device according to claim 14, wherein:

the message reception unit is further configured to obtain an updated list of NAS algorithms from an Insert Subscriber Data Request message sent by the HSS when the list of NAS algorithms is updated; and the selection processing unit is further configured to reselect an NAS algorithm from the updated list of NAS algorithms; to send a Security Mode Command message carrying the reselected NAS algorithm to the UE when the reselected NAS algorithm is different from a current NAS algorithm; and to reply with an Insert Subscriber Data Answer message to the HSS when the reselected NAS algorithm is the same as the current NAS algorithm or when the NAS algorithm is reselected from the updated lists of NAS algorithms unsuccessfully.

\* \* \* \* \*